June 23, 1959 V. A. BLAES 2,891,736

AUTOMATIC TAPE THREADING DEVICE

Filed June 6, 1956 7 Sheets-Sheet 1

INVENTOR.
Viggo A. Blaes
BY
[signature]

INVENTOR.
Viggo A. Blaes
BY
Thomas W. Y. Clark

June 23, 1959 V. A. BLAES 2,891,736

AUTOMATIC TAPE THREADING DEVICE

Filed June 6, 1956 7 Sheets-Sheet 3

INVENTOR.
Viggo A. Blaes
BY
Thomas W. J. Clark

June 23, 1959 V. A. BLAES 2,891,736

AUTOMATIC TAPE THREADING DEVICE

Filed June 6, 1956 7 Sheets-Sheet 4

INVENTOR.

Viggo A. Blaes

BY

Thomas W. Y. Clark

June 23, 1959 V. A. BLAES 2,891,736

AUTOMATIC TAPE THREADING DEVICE

Filed June 6, 1956 7 Sheets-Sheet 5

INVENTOR.

Viggo A. Blaes

BY

Thomas W. Y. Clark

INVENTOR.
Viggo A. Blaes
BY
Thomas W. J. Clark

June 23, 1959 V. A. BLAES 2,891,736

AUTOMATIC TAPE THREADING DEVICE

Filed June 6, 1956 7 Sheets-Sheet 7

INVENTOR.

Viggo A. Blaes

BY

[signature]

United States Patent Office 2,891,736 Patented June 23, 1959

2,891,736

AUTOMATIC TAPE THREADING DEVICE

Viggo A. Blaes, Baltimore, Md.

Application June 6, 1956, Serial No. 589,665

20 Claims. (Cl. 242—55.12)

This invention relates to an automatic tape threading device for magnetic tape recording machines. The record track in such machines is usually a narrow tape of paper or plastic or a synthetic resin compound and provided on one or both surfaces with a thin layer of uniformly magnetized powder. The tapes are wound on flanged reels having a core and in the production of a record they are unwound from one reel and wound on another, going past various magnetic heads. After their production the tape is generally rewound on the original reel and then placed in a similar machine or in the same machine and played back.

The tapes comprising the record track are quite fragile and readily damaged and it is very desirable to handle them as little and as skillfully as possible.

The object of the present invention is to remove the necessity of handling the tape by hand and to carry on the threading and winding of the tape from the supply reel to the takeup reel automatically and then to rewind the tape again on the supply reel without the necessity of any contact of the tape by the operator.

Another object of the invention is to stop the playing of the tape record at any desired place and to rewind it and then to continue the playing of the record in the original direction so that any portion of the record can be played over as often as may be desired automatically and without the necessity of handling the tape by hand.

Another object of the invention is to so drive and control the speed of the supply reel motor that it may be used to engage the end of the tape for the threading rapidly and to allow the unreeling, without slack, of the tape as it is taken up by the takeup reel and then to rewind the tape on the supply reel.

Another object of the invention is to take the end of the tape from the supply reel and take it past the magnetic heads and attach it firmly to the core of the takeup reel after which the magnetic heads, or the one selected, may be placed in operation in relation to the tape.

Another object of the invention is to release the end secured to the takeup reel and to return the tape to the rewind reel.

Another object of the invention is to completely rewind the tape on the supply or rewind reel, leaving the tape end secure from unwinding.

It is also an object of the invention that the reels and the accompanying mechanism may be used with standard tape on which the particular elements of the present invention may not be embodied and in which the special parts used for this invention will not interfere with the usual playing of the record and reproducing it in the machine.

Other objects and advantages of the invention will be apparent from the following description and the accompanying drawings forming a part hereof and in which:

Figure 7(*a*) is a similar view with the channel in position for record rewinding.

Figure 13(*a*) is a top plan view thereof.

Figure 13(*b*) is a top plan view of an alternate form of tape lead contact.

Figure 13(*c*) is a top plan view of the tail end of the tape.

Similar numerals refer to similar parts throughout the several views.

Figures 1, 15:
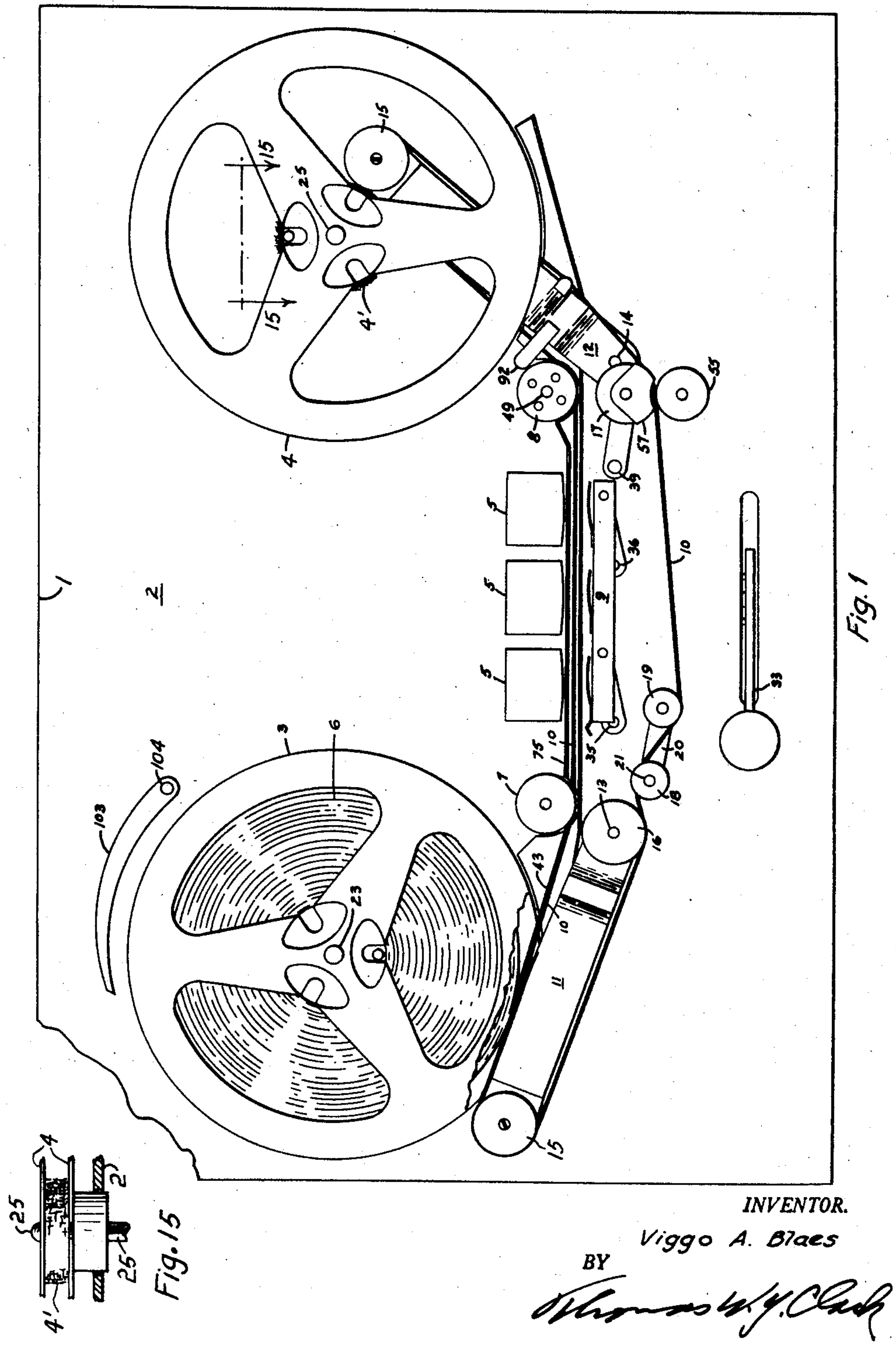
Figure 1 is a top plan view of the machine as it appears in an early stage of the threading operation.
Figure 15 is a fragmentary sectional view on line 15—15 of Figure 1, shown with the machine top panel broken away.

The cabinet 1 has a horizontal panel 2 above which are placed a supply or rewind reel 3, a takeup reel 4 and a plurality of magnetic heads 5. Three such heads are shown, the number varying with the electronic circuitry of the recording and play back amplifiers, the number not being important for the present invention. The tape 6, whether or not the present invention is used, passes over pulleys 7 and 8 and is affixed to the core of the takeup reel 4, on which there is fabric 4'. The pressure pad bar 9 would then be placed against the tape to hold it against the magnetic heads 5 and the machine would be operable in its ordinary form.

With the present invention, however, an endless fabric belt 10 is placed around arms 11 and 12 fixed on shafts 13 and 14, respectively, the belt going over the same inner pulleys 7 and 8 and outer pulleys 15 at the swinging ends of the arms 11 and 12 and outer pulley 16 at the pivoted end of arm 11 and pressure roller 17 adjacent the pivot of arm 12. Slack takeup pulleys 18 and 19 are on bar 20 pivoted on the hub 21 of pulley 18 which is pulled clockwise by the spring 22 and the belt is kept tight while passing between the two pulleys 18 and 19 by the action of the spring. Reel 3 is mounted on spindle 23 of rewind motor 24. Reel 4 is mounted on spindle 25 of takeup motor 26.

The arms 11 and 12, rotating with shafts 13 and 14 are turned by levers 27 and 28 rigidly attached to the shafts. These levers 27 and 28 are in turn subject to mechanical control by fulcrum levers 29 and 30 respectively. These fulcrum levers are pivotally connected by ball joints with rods 31 and 32 respectively which at their other ends are connected by similar joints to selector lever 33 which extends through the panel 2 for manually swinging the arms 11 and 12 out of the reels. The arms 11 and 12 are normally biased to ride between the reel flanges by means of springs 34.

Pressure pad bar 9 is pivotally mounted on arms on shafts 35 and 36 and the shafts comprising these pivots, to which the arms are affixed, pass through the panel and have attached to them respectively levers 37 and 38. Pressure roller 17 is likewise mounted on an arm affixed to a shaft 39 to which is fixed lever 40, connected with levers 37 and 38 by bar 41. A dog 42 is on rod 31 and contacts the lower end of lever 37 when selector lever 33 is moved to the right to withdraw arms 11 and 12 from the reels. This forcibly removes the pressure pad bar 9 and pressure roller 17 from the path of the belt and tape.

Figures 13, 13A:
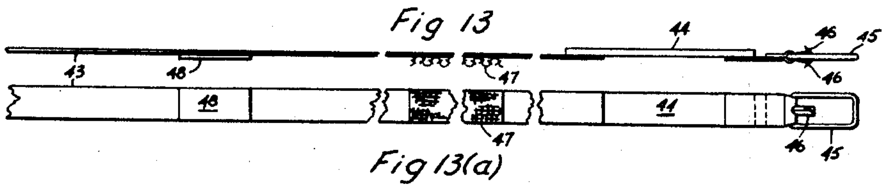
Figure 13 is a side elevational view of the lead end of the tape.
Figure 13B:
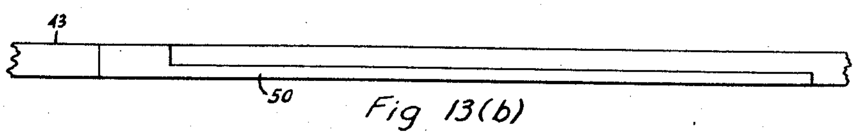
Figure 13C:
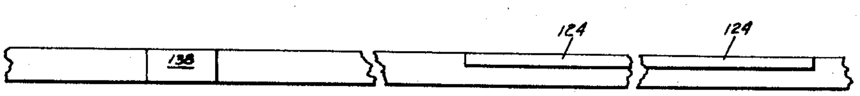

The tape 6 has a leader or leading end 43, see Figure 13, preferably made of thicker plastic than the tape itself. To the end of the thicker section is connected an elastic section 44, and at the end of that section is a metal loop 45, having at its base projecting from both sides metal tines 46, rigid with the loop, so that when the loop acting as a lever is turned on its outer end, the base being lifted, the tines will be withdrawn from fabric aligned with the leader. Spaced circumferentially around the leader, as it is wound on a loaded reel, on the back of the leader, is a fabric section 47 into which the adjacent tines at the leader end may be embedded to hold the tape wound on the reel. The leader 43 has an electrical conductor spaced from the fabric section and it may be of aluminum foil and is shown at 48 in the normal form of contact which is used on tapes to be played at high speed and an alternate form of contact is shown at 49 which is used on tapes to be played at low speed. High speed is used where accurate reproduction of high frequency sounds is required. Slow speed is used where a sacrifice in the reproduction of sounds in the upper octaves may be tolerated, as for example, in voice reproduction. The normal contact 48 has no function during the threading operation since none of the electrical mechanisms are sensitive to it during the threading operation.

Figure 4:
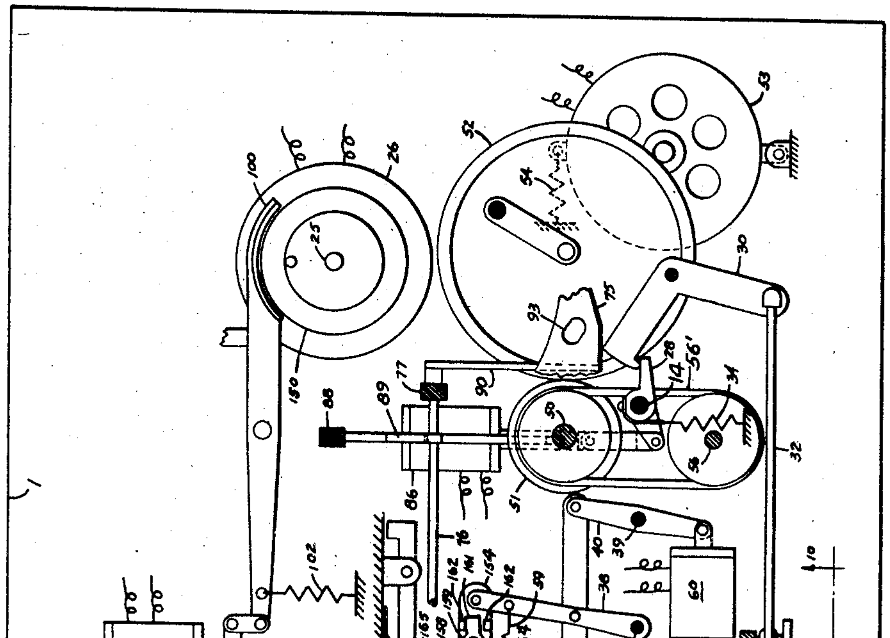
Figure 4 is a top plan view of the operating mechanism.

Although the takeup motor 26 gently tends to wind the tape on the takeup reel 4, the actual speed of the tape is controlled by the pulley 8 which is actually the tape capstan. This pulley 8 is mounted on shaft 50 carrying disk 51, driven through surface contact with idler wheel 52 which has a high moment of inertia to dampen rotational oscillations, speed fluctuations, generated by the capstan motor 53, the drive shaft of which frictionally contacts idler wheel 52 against which it is held by spring 54 as shown in Figure 4.

Figure 6:
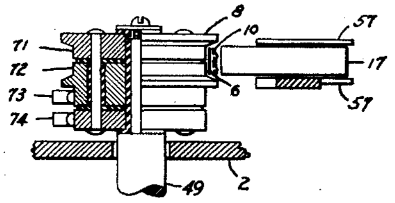
Figure 6 is a sectional veiw on line 6—6 of Figure 2 of the split pulley capstan and its adjacent pressure roll.

During threading the tines must not be drawn across the magnetic heads. At this time the pressure pad bar 9 and the pressure roller 17 are retracted from the magnetic heads 5, and the tape capstan 8 as shown in Figure 1. The pressure roller is then held against the auxiliary capstan 55 mounted on shaft 56. Belt 56', by means of pulleys on shafts 56 and 50 drives the auxiliary capstan from the tape capstan motor. The fabric belt 10 is gripped between the pressure roller 17 and the auxiliary capstan 55 and is forced to move in the same direction and at the same speed as when it is powered by the tape capstan 8. The pressure roller is made without flanges as shown in Figure 6 so that it may fit between the flanges of the tape capstan 8. The pressure roller has upper and lower non-rotating flanges 57 that guide the belt 10 around the opposite side of the pressure rollers, opposite from the tape capstan 8. When the belt is drawn by the tape capstan 8, contact pressure is supplied by the tension of springs 58 and 59. When the belt is drawn by the auxiliary capstan 55, the contact pressure on the belt is supplied by means of a solenoid 60. Only the excess force remaining after the extension of springs 58 and 59 is applied to the belt by the auxiliary capstan.

Figure 5:
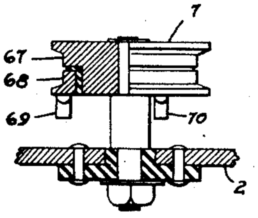
Figure 5 is a sectional view of a split pulley guide on line 5—5 of Figure 2.
Figure 9:
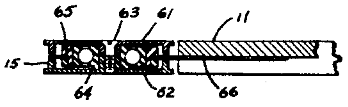
Figure 9 is a fragmentary sectional view on line 9—9 of Figure 3 of the end of one arm.
Figure 10:
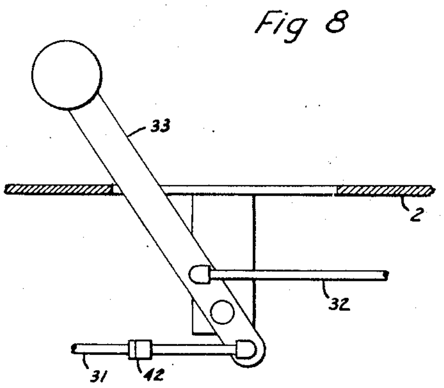
Figure 10 is a fragmentary sectional view on line 10—10 of Figure 4.

The extremities of the arms 11 and 12 have their own pulleys 15 which are made in two similar halves 61 and 62 connected by a screw 63 around a ball race 64 held in turn by a two piece ring 65 fitting in an opening in metal extension 66 on the arms 11 and 12. This construction is illustrated in Figure 9. The pulley 7 is illustrated in Figure 5 as having an upper portion 67 and a lower portion 68 insulated therefrom with the electric brushes 69 and 70 leading from insulated parts of the respective portions of the pulley. The tape capstan 8, Figure 6, is likewise divided by insulation between its upper section 71 and lower section 72 from which contact brushes 73 and 74 respectively lead.

When the tape is being rewound on rewind reel 3 it is important that the tines 43 should not contact any other parts on their reverse movement and to prevent that result a channel 75 in which the backward moving tines may move freely is provided. This channel is shown in its lower inoperative position in Figure 7 and in its upper operative position in Figure 7(*a*).

Figure 2:
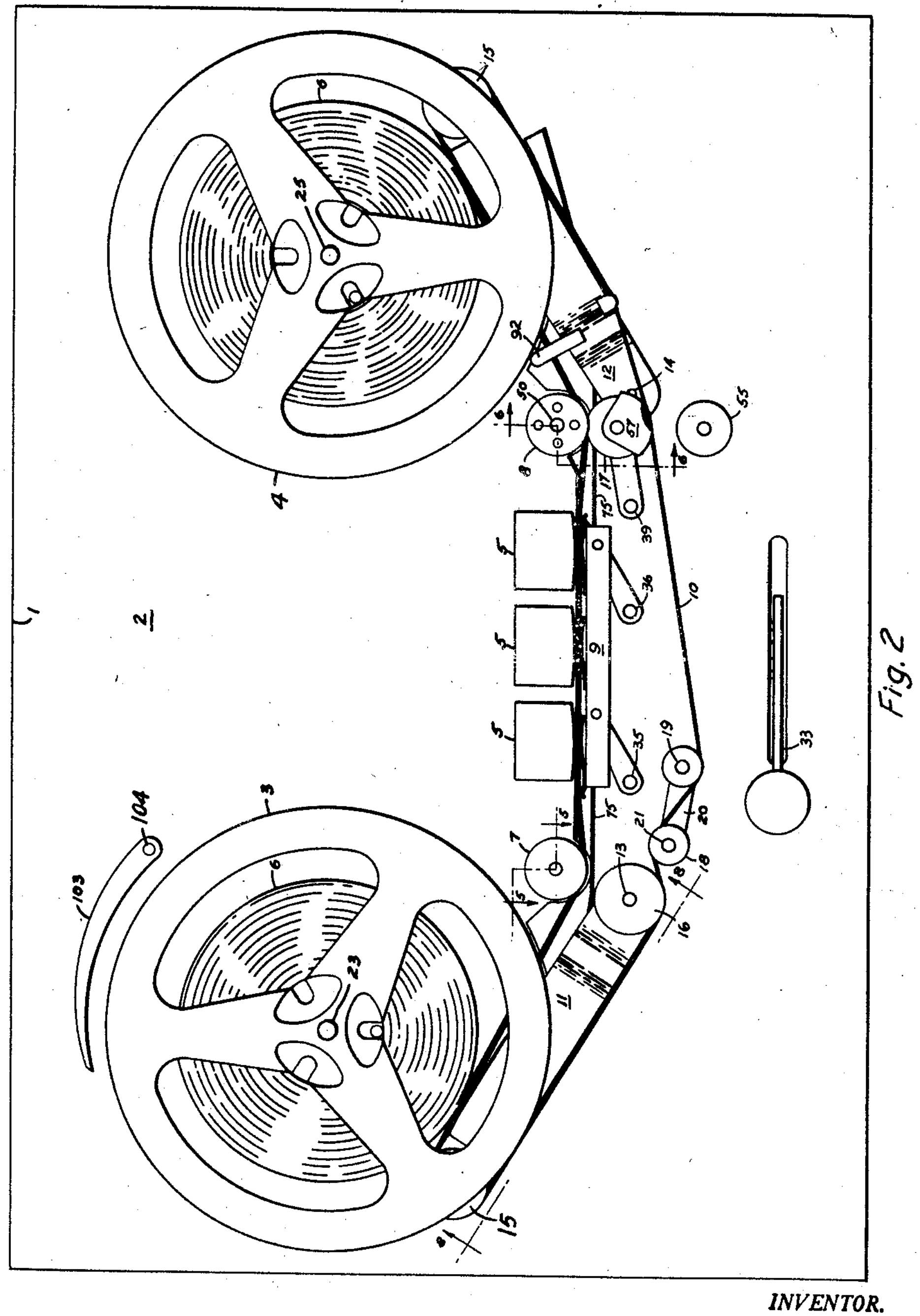
Figure 2 is a similar view after the threading has taken place and the record is being played.
Figure 3:
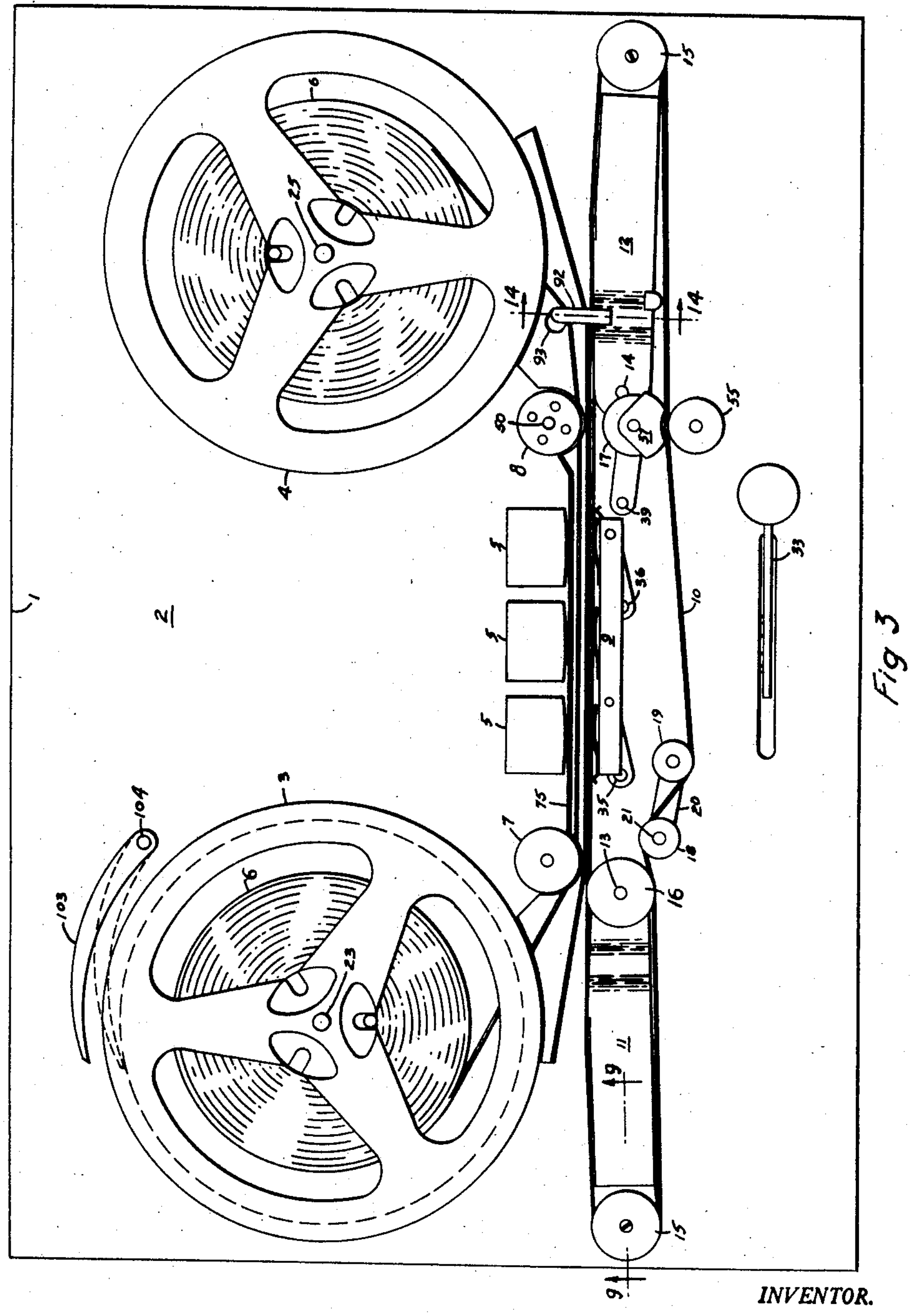
Figure 3 is a similar view during the rewinding of the tape on the supply reel.
Figure 7:
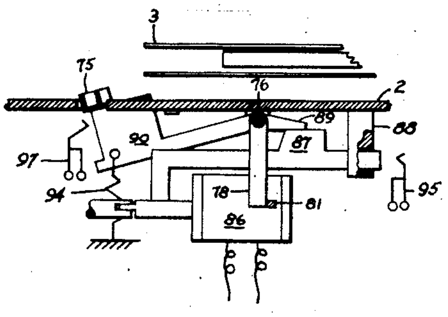
Figure 7 is a fragmentary sectional view on line 7—7 of Figure 4 with the channel in position for record playing.
Figure 7A:
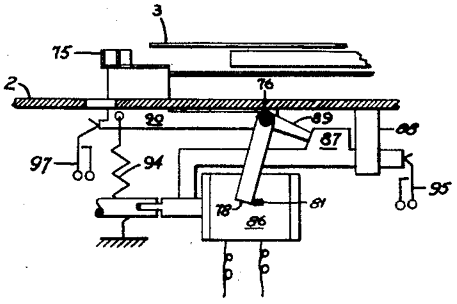
Figure 8:
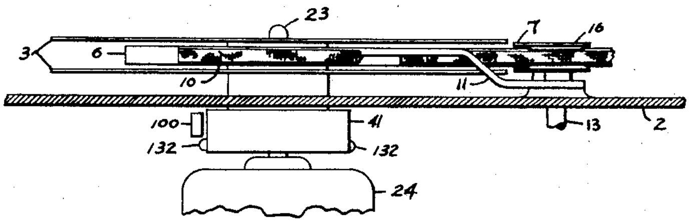
Figure 8 is a fragmentary sectional view on line 8—8 of Figure 2.

The slot in panel 2, shown in Figures 7 and 7(*a*), to permit low retraction of channel 75, is not shown in Figures 1 through 3 because in these views it occurs so close to the edge of the channel 75 that it would not show clearly. The channel is mounted on shaft 76 rotating in bearings 77 under the panel 2. The channel is held up by means of an arm 78 rigidly attached to shaft 76 which is in turn moved by bellcrank 79 pivoted on fixed shaft 80 supported within the cabinet 1. This bellcrank has a projecting finger 81 bearing against the arm 78 as shown in Figures 4 and 7(*a*).

Arms 11 and 12 are also moved in and out of the reels by arm solenoids 86, the armatures of these solenoids being connected by articulated rods to the levers 27 and 28. These armatures also have interlock pieces 87 thereon riding in guides 88. Shaft 76 has also fixed thereon pairs of arms 89 and 90, the latter of which carry the channel 75. When the armatures of the solenoids 86 are extended, the interlock members 87 hold the channel down as illustrated in Figure 7, by holding the arms 89 up. When the channel 75 is up, arms 89 hold the armatures of solenoids 86 retracted as illustrated in Figure 7(*a*).

Figure 14:
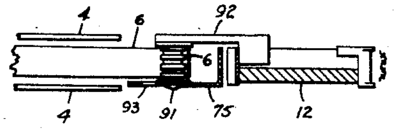
Figure 14 is a sectional view on line 14—14 of Figure 3.

Since the capstan motor 53 can not free wheel, a guide post 91 supported on extension 92 from arm 12 is provided, as shown in Figure 14, there being an opening 93 in channel 75 to accommodate the guide post. This guide post relieves the tape from pressure on the stationary capstan 8 during rewind when arm 12 is outstretched, as in Figure 3.

The mechanical and electrical interlocking between the arms 11 and 12 and channel 75 is as follows, on beginning the rewind, as hereinafter described, the solenoid 60 is energized and extends spring 59 which applies force to the arm 151 which rotates on shaft 80. Bellcrank 79 also rotates on shaft 80 but is not constrained to move with the arm 151 except by the action of the bent leaf latching spring 152 which is fastened to the arm 151 and catches an offset on the end of the bellcrank 79. When the armatures of solenoids 86 are retracted, which occurs at the start of rewinding, and also arms 11 and 12 are outstretched, by solenoids 86, the arms 89 drop as shown in Figure 7(*a*). Thus channel 75 cannot move up until arms 11 and 12, the pressure roller 17 and pressure pad bar 9 have all been retracted. This is desirable to prevent the channel 75 from fouling on either the tape, arms 11 and 12 or the pressure pad bar 9 or the pressure roller 17. The normally closed switches 95 and 97 are opened when the channel 75 is elevated thereby shutting off the current to the capstan motor 52 and the arm solenoids 86, but the arm 89 then holds the armatures of the solenoids retracted.

The arm 151 is held against the fixed stop 153 by spring 59 while the channel 75 is up during rewind. When the solenoid is retracted, as during rewind, the bar 154 will be in the position shown in Figure 4. The bar 154 is pivotally mounted on the free end of lever 38 and is guided on one side by the latching spring 152 on arm 151 and on the other side by the stop 155 mounted on the bellcrank 79. The bar extends above the bellcrank 79. When the arm 151 moves to the right under the urging of spring 59, carrying the bellcrank 79 around with it, raising the channel 75, the fixedly pivoted arm 156 drops down due to the force of leaf spring 157, and its release by the lowering bellcrank 79. This latches the pawl 158 which pivots on shaft 159 mounted on the bar 154. The pawl is biased by the spring 160 whose opposite end is fastened to a pin on the bar 154. The pawl also has a small projection 161 which limits the movement of the pawl by the action of the opposite stops 162.

When the rewind is terminated, solenoid 60 is released, as hereinafter described, and the bar 154 on moving to the left will carry the pawl 158 which is engaged by the finger on the arm 156 and thereby rotates the pawl against its spring 160. The pointed end of the pawl is also restrained by the fixed stop 165 which prevents the end of the pawl from moving upward. This will force bar 154 to rotate counter-clockwise until projection 161 comes to rest upon the lower stop 162. The latching spring 152 on being forced downwardly by bar 154 releases bellcrank 79 which then returns to the position shown in Figure 4 due to the force of spring 94 on the channel 75, tending to pull it down, acting through the arms 90 and 78. As the bellcrank approaches the fixed stop 163, the bellcrank contacts the projection on the end of arm 156 and forces it up until the bellcrank reaches stop 163. The upward movement of arm 156 disengages it from pawl 158, then permitting arm 38 to move to the left under the urging of spring 58. A downwardly directed finger 164 on bar 154 catches the arm 151 and moves that arm along to the left also. When the bar 154 reaches the end of its return stroke, to the left, the latching spring 152 is pushed over the detent on the free end of the bellcrank and moves into the detent. Thus at the end of rewind, all power being cut off, except to the brakes as hereinafter described, the channel drops first, releasing arms 11 and 12 which swing up under the urging of springs 34. The pressure pad bar and pressure roller move up against the fabric belt 10 under the urging of spring 58 at the same time as the arms 11 and 12 move up. This sequence is desirable to prevent the pressure bar and roller from closing on the channel before it has had a chance to drop down.

During the threading operation at which time solenoid 60 is energized and bar 154 moves to the right, the bellcrank 79 and arm 156 remain in the position indicated in Figure 4. Later release of solenoid 60 doese not result in the engagement of the finger on the arm 156 by the pawl 158, and bar 154 slides freely to the left.

Brakes 100 are provided for both reels 3 and 4, shown in Figure 4, acting on the brake drums 150 mounted on shafts 23 and 25 of the two motors. A brake solenoid 101 actuates the brakes and springs 102 normally hold them in off position.

When the tape has been rewound on the rewind reel 3, a feeler 103 contacts the leader. This feeler is rigidly attached to shaft 104 to which is rigidly connected the smaller arm 105, the other end of which is held centrally of the springs 106 connected to stopping solenoid 107. Shaft 104 is pivoted in arm 108 which in turn is pivoted on fixed shaft 109 and is biased to the left by spring 110. Arm 108 has extension 111 fitting between the sides of stop 112 and the extension operates switch 113 which is open as shown in Figure 4 and also switch 114 which is closed as shown in this figure. Movement of the extension 111 closes switch 113 and opens switch 114 simultaneously.

When the feeler is between the flanges of the reel and is contacted by the tape it is pushed back bodily on its shaft pivot 104 which in turn throws the switches 113 and 114. The feeler is pulled within the flanges by retraction of the stopping solenoid 107, this action drawing the feeler down.

In threading, with a full reel on the rewind motor the arms 11 and 12 are held against the tape and reel hub by the tension of springs 34. The channel 75 is in the lower position shown in Figure 7. The pressure pad bar 9 and pressure roller 17 are up as shown in Figure 2. Depressing the thread button 115 energizes the rewind motor 24 and the capstan motor 52 and the reel 3 begins to turn clockwise and the tape capstan 8 draws the belt 10 clockwise around its circuit. When the outward projecting tine, the inward one projecting inwardly against the fabric portion of the tape, is engaged or caught by the belt, the belt and tines approach in the opposite directions, the elastic section of the leader then gives to absorb the shock and the tine is removed from the fabric on the reel by the impact and is then held by the belt 10 and travels with it, reversing the direction of travel of the reel 3. A thermal time delay switch 116 opens a preset length of time after the energizing of the rewind motor 24 and places the resistor 117 in series with the rewind motor. This prevents the overheating of the motor. The initial torque required of the motor 24 is fairly high but after the tape leader has engaged in the belt 10, the torque requirement is greatly reduced for it only serves then to prevent back lash of the tape.

When the metal loop surrounding the tines reaches the split pulley 7, see Figure 5, the metal closes the circuit across the halves 67 and 68 of the pulley causing self latching relay 118 to close and it therefore remains closed after the passage of the loop and the tines. The closing of this relay energizes takeup motor 26. A resistor 119 in series with the take up motor is adjusted to provide a satisfactory relationship between the peripheral speed of the hub of reel 4 and the speed of belt 10 at the instant the tines reach the hub of reel 4. The time interval between the energizing of the takeup motor 26 and the arrival of the tines at its reel is always the same because it starts with the closing of the circuit on split pulley 7. This insures uniformity of threading of the tape on the takeup reel. The closing of relay 118 also energizes the pressure roller solenoid 60 through a time delay switch 120. That solenoid takes the position shown in Figure 4 and the pressure roller 17 and pressure pad bar 9 retract as shown in Figure 1. This figure shows the threading operation at the instant the loop and tines arrive at the pulley 7 and Figure 4 shows the location of the mechanical parts beneath the panel 2 at the same instant. The pressure roller and pressure pads are retracted to avoid drawing the tines over magnetic heads 5. At this time the pressure roller is held against the auxiliary capstan 55 to drive the belt.

When the tines arrive at the hub of reel 4, which is covered by fabric 4', Figure 15, because the peripheral speed of the hub slightly exceeds the speed of the belt 10, the tines on the leader are transferred from the belt to the hub. The time delay switch 120 opens to release solenoid 60, after the leader end of the tape has had time to be transferred to the takeup reel 4, and which, as above stated, always takes place in a uniform time after closing the circuit across pulley 7. This releases solenoid 60 so that the pressure pads and pressure roller move in against the magnetic heads and the tape capstan because of the tension in springs 58 and 59.

As above described the normal contact 48 has no function during this operation. The alternate contact 49 closes a circuit across the lower halves 68 and 72 of the split pulley 7 and the capstan 8 respectively which actuates the self-latching relay 122 which in turn connects low speed windings of the capstan motor 52 to the power source, this motor being a two speed motor. This relay 122 remains latched until switch 114 is opened, see Figures 4 and 11. This takes place only after the termination of rewind and the machine has automatically stopped. Whether a slow or fast tape is put on the machine the threading operation is conducted with the capstan motor at high speed. This assures uniformity of operation in the shortest possible threading time. To accomplish this purpose, the lower speed sensing contact 49 is put at the end of the leader. The tail end of this alternate contact 49 has a segment spanning the tape and has the same function as the contact 48 on the normal leader.

When all the usable tape has been transferred from reel 3 to reel 4, a metal foil conductor 124 closes the circuit between the upper halves 67 and 71 of the split pulley 7 and the capstan 8 respectively and self-latching relay 125 is energized which disconnects relay 118 which in turn disconnects takeup motor 26. Relay 125 also energizes the arm solenoids 86 and the pressure roller solenoid 60 shown in Figures 4 and 11. This pulls the arms 11 and 12 out of the reels and raises the channel 75 and with motors 26 and 52 shut off the tape begins to rewind because the only force on it is that exerted by the rewind motor 24. Although the resistor 117 remains in series with the rewind motor, sufficient torque is available to accomplish the rewind function. The rewind motor will gradually accelerate up to fairly high speed because there is no load applied on the tape other than the inertia load of the two reels and the tape and the rotors of motors 24 and 25.

When the tail end of the leader at the leading end of the tape 48 or 49 reaches the capstan 8, the electrical circuit across the halves 71 and 72 of the capstan is closed. This causes the self-latching relay 126 to close. Relay 126 cannot actuate unless relay 125 is latched and since this occurs only after the contact 124 has passed by the heads, relay 126 can never be actuated except during rewind, or for the mergency stop hereafter described. The closing of relay 126 actuates the brake solenoid 101, and brakes are applied to reels 3 and 4. It also removes electrical power from motor 24 and the voltage that charges capacitor 127. The capacitor charging voltage is negative on the grid of vacuum tube 128 and prevents it from conducting so long as the charging voltage is maintained. Actuation of relay 126 removes the negative bias voltage from the capacitor and it discharges through resistor 129, which is connected across the grid and cathode of the tube. The discharge of the capacitor presents a steadily decreasing voltage across the grid and cathode of the triode vacuum tube 128. When the bias voltage across the grid and cathode reaches a predetermined value, the tube conducts and relay 130 closes. The time between the removal of the charging voltage on the capacitor and the instant the tube first conducts is always the same and depends upon the magnitude of the charging voltage and the value of the capacitor and resistor. If the time between the periodic closing of switch 131, which is actuated by the bumps 132 on the rim of the brake drum 150 on reel 3, is shorter than the firing time for the tube, then the capacitor will merely recharge each time the switch 131 closes and there will be no actuation of relay 130 in the plate circuit of the tube. However, when the reel 3 reaches a predetermined low rotational speed, the tube will conduct during the interval between the firing of the tube and the next recharge of the capacitor 127. In this way the motor 24 has positive speed regulation; that is, if something happens to cause a loss of speed, the motor will receive power over a larger fraction of each revolution and it will speed up. Conversely, if something happens to permit the motor to speed up, the motor will receive power for a shorter fraction of each revolution and the motor will slow down.

The first time the tube conducts during the rewind operation, self-latching relay 133 is made to close by the actuation of relay 130. Relay 133 releases the solenoid 101 which releases the brakes and energizes the stopping solenoid 107.

The length of the leader is enough to permit the reels to decelerate from the fast rewind speed to the controlled slow speed before the end of the leader reaches reel 3. The loop 44 at the end of the leader surrounding the tines acts as a lever as before described to pry the tines out of the fabric 4' on the hub of reel 4.

Actuation of the stopping solenoid 107, causes feeler 103 to rotate against the almost fully loaded reel, Figure 3, as indicated by the dotted lines. The position of arm 108 is not affected by the actuation of solenoid 107. However when the end of the leader comes around to the top of feeler 103, the outward-projecting tine is caught and held by the feeler. The sudden stopping of the fully loaded reel and motor produces a reaction that causes a longitudinal movement of feeler 103, which in turn causes a clockwise rotation of arm 108. The switches 113 and 114 are momentarily closed and opened, respectively. The switch 113, Figures 4 and 11, actuates the stop button solenoid 134, and this in turn releases either the threading 115 or rewind 135 buttons, whichever may have been depressed. All electrical power is then cut off, except to the brakes which are actuated by the switch 140 on the stop button 134.

The stopping of reel 3 by feeler 103 also sets the tine into the fabric back of the adjacent turn of the leader so that the tape is now in exactly the same condition as it was when first put on the machine.

Figure 12:
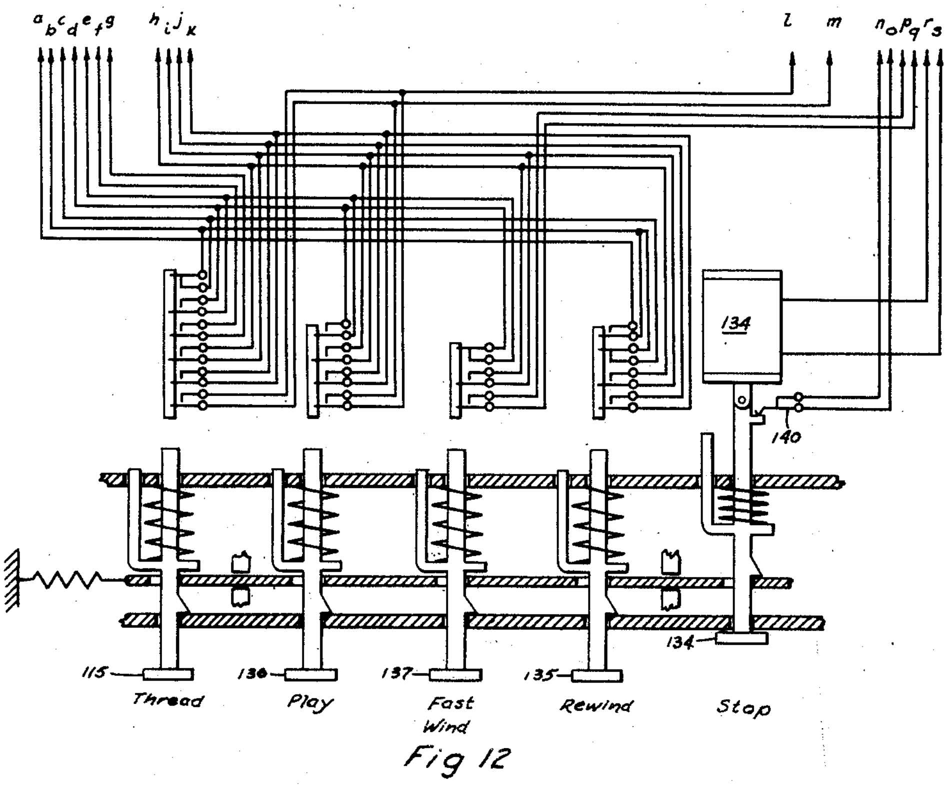
Fig. 12 is a continuation of the circuitry of Figure 11 showing the operating buttons for the circuits.

If for some reason the machine is stopped when the tape has been only partially transferred onto the reel 4, forward tape motion may be resumed, either for the purpose of play back or recording, by pressing the play button 131, Figure 12. The same sequence of events will follow as when motion was first initiated by the thread button 115, that is, the tape will automatically rewind after entirely winding onto reel 4 and will automatically stop when reel 3 is fully loaded.

If the machine has been stopped after threading has been completed, the tape may be transferred rapidly from reel 3 to reel 4 by pressing the fast winding button 137. Before this is done however, selector lever 33 must be placed in the right hand position, as in Figure 3 This moves the arms 11 and 12 into their retracted straight position and retracts the pressure roller and pressure pads and lowers the channel so that the tape may move freely past the recording heads. The takeup motor is energized and there is no restraint whatever on the rewind reel.

An emergency stop is provided to prevent complete unwinding of the tape from reel 3. This is accomplished as follows: When the metallic foil, 124, near the end of the tape reaches the magnetic heads, it closes the electrical circuit across the upper halves 67 and 71 of pulley 7 and capstan 8 respectively in Figures 1 and 11. This closes the self-latching relay 125 which releases relay 118 and shuts off the takeup motor 26. A second foil contactor 138 in Figure 13(*c*), follows shortly after and on touching capstan 8, actuates self-latched relay 126. Relay 126 cannot close without 125 first being closed. The spacing between the foil contactors, 124 and 138 is great enough so that the second contactor 138 never reaches capstan 8, this would stop the operation by application of the brakes, during the normal thread or play operations. During the emergency stop sequence, the brakes are applied by the closing of relay 126 which actuates solenoid 101. Relay 126 also tries to actuate the roller and arm solenoids 60 and 86 but these electrical circuits are opened by switches 97 and 139. Switch 139 is actuated by lever 29 in Figure 4 and switch 97 is actuated by the arm 90. Enough tape is provided after the secondary foil 138 so that both reels are completely arrested by the brakes before the end of the tape has a chance to leave reel 3. In this way, it is never necessary to handle the tape by hand so long as the proper contacts are employed.

The brakes and the relays 125 and 126 remain energized after the machine stops. It is necessary to push the stop button after the reels have come to a stop in order to release the rewind button 135 and the relays 125 and 126. The brakes remain energized due to the closing of switch 140 by the stop button 134.

The tape may be rewound at high speed from reel 4 to reel 3 by placing selector lever 33 in the right hand position and pressing the rewind button 135. The same sequence of events takes place as during the rewind portion of the complete cycle initiated by pressing the thread button 115.

Figure 11:
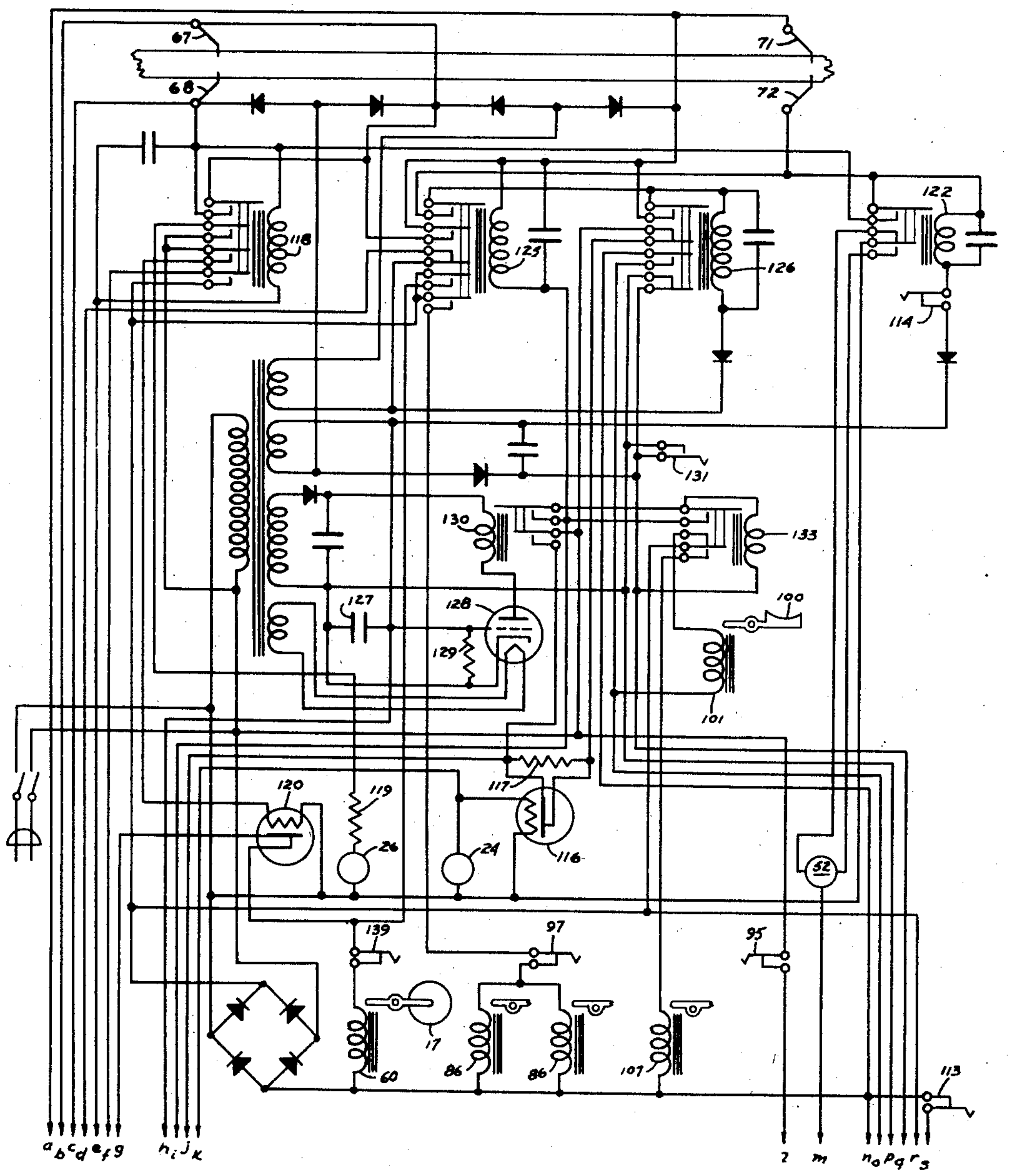
Figure 11 is a partial diagrammatic view of the electric circuits and the elements which they operate.

The electrical diagrams of Figures 11 and 12 utilize an alternating current power source. To obtain direct current from this source for the operation of the solenoids and relays, diode, half wave, rectifiers are shown in the upper portion of Figure 11, and in the lower portion of this figure, a full wave, bridge type, rectifier is shown. In the electrical diagram, Figure 11, various capacitors are illustrated without being above described. The capacitors serve to smooth out direct current pulsations that remain after the alternating current power supply has been rectified by the various diode, half wave, rectifiers. This is desirable to prevent chattering of the relay contacts. These electrical diagrams also show diagrammatically the electrical connections required for effecting the operation described, although the circuits for the operation of magnetic heads are not shown, these forming no part of this invention.

It is believed that the operation of the invention will be clear from the above description which is necessarily of a detailed character in order that the specific embodiment of the invention may be completely set forth. It is to be understood that the specific terminology is not intended to be restrictive or confining and that various rearrangements of parts and modifications of detail may be resorted to without departing from the scope of the invention as herein claimed.

What is claimed as new and is desired to be secured by Letters Patent is:

1. A tape threading machine having a pair of flanged reels mounted for rotation in a common plane, one being wound full of tape and the other empty, comprising in combination, means to transport the outer end of the tape on the full reel to the empty reel, cooperating means on the empty reel, the tape end and transport means to attach the said tape end to the empty reel for winding thereon and simultaneously to release it from the transport means, and means to rotate the reels and to move the tape therebetween, from the full to the empty reel the transport means traveling with the tape from the full to the empty reel.

2. The machine of claim 1 including means separate from the reel rotating means to drive the transport means, said drive means being spaced from the tape end while carried by the transport means.

3. A tape threading machine having a pair of flanged reels mounted for rotation in a common plane, one being wound full of tape and the other empty, comprising in combination, means to hold the tape wound on the full reel, means to transport the outer end of the tape on the full reel to the empty reel the transport means traveling with the tape from the full to the empty reel and cooperating means on said tape end and the transport means to simultaneously release said tape end from the full reel and attach it to the tape transport means.

4. A tape threading machine having a pair of flanged reels mounted for rotation in a common plane, one being wound full of tape and the other empty, comprising in combination, means to transport the outer end of the tape on the full reel to the empty reel the transport means traveling with the tape from the full to the empty reel and being movable to and from engagement with the empty reel, means to rotate the empty reel, cooperating means on the empty reel, the tape end and transport means to attach the said tape end to the empty reel for winding thereon and simultaneously to release it from the transport means and means to move the transport means to engagement with the empty reel to thereby effect the attachment of said tape end to the empty reel.

5. A tape winding machine having a pair of flanged reels mounted for rotation in a common plane, one being wound full of tape and the other empty, comprising in combination, means to transport the outer end of the tape on the full reel to the empty reel the transport means traveling with the tape from the full to the empty reel and being movable to and from engagement with the empty reel and means to attach the tape end to the transport means and release it therefrom and attach it to the empty reel and means to move the transport means to engagement with the empty reel to thereby effect said respective release and attachment from the transport means to the empty reel.

6. A tape winding machine having flanged rewind and takeup reels mounted for rotation in a common plane, means to connect one end of the tape to the takeup reel, means to rotate the reels and to move the tape therebetween from one reel to the other and finally from the takeup to the rewind reel cooperating means on the takeup reel, the tape and tape moving means to attach the said tape end to the takeup reel for winding thereon and simultaneously to release it from the tape moving means, means to release the said tape end from the takeup reel and means to guide the released end to the rewind reel.

7. A tape winding machine having flanged rewind and takeup reels mounted for rotation in a common plane, means to connect one end of the tape to the takeup reel, means to rotate the reels and to move the tape therebetween from one reel to the other and finally from the takeup to the rewind reel, means to guide the respective tape end after release from the takeup reel around the rewind reel, means to secure the tape end to the rewind reel after the tape has been completely rewound thereon and to stop the rotation of the rewind reel.

8. A tape recording reproducing machine having a pair of flanged reels mounted for rotation in a common plane, means to rotate the reels and to move the tape therebetween from one reel to the other, recording, reproducing heads between the reels, the reels being positioned to draw the tape over the heads in passing from one reel to the other, means to hold the tape in functioning contact with the heads and shielding means movable to and from position to separate the tape from the heads and holding means while continuing the traverse thereof between the reels.

9. In a tape threader having a pair of flanged reels mounted for rotation in a common plane, one being wound full of tape and the other empty and having means to rotate the empty reel, the outer tape end of the full reel having catching means thereon and the empty reel having catching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel.

10. The tape threader of claim 9 including means to stop the drive of the empty reel prior to the tape being completely unwound from the full reel.

11. The tape threader of claim 9 including means to brake the rotation of both reels prior to the tape being completely unwound from the full reel.

12. In a tape recorder having a pair of flanged reels mounted for rotation in a common plane, one being wound full of tape and the other empty and having means to rotate the empty reel, the outer tape end of the full reel having catching means thereon and the empty reel having catching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel, magnetic heads between the reels positioned for engagement by the threaded tape and means to effect said engagement and to release it.

13. In a tape recorder having a pair of flanged reels mounted for rotation in a common plane, one being wound full of tape and the other empty and having means to rotate the empty reel, the outer tape end of the full reel having catching means thereon and the empty reel having catching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel, magnetic heads between the reels positioned for engagement by the threaded tape, means to release said magnet head engagement during threading and to effect it after threading is complete and means to coordinate the drive speeds of the empty reel and belt.

14. In a tape recorder having a pair of flanged reels mounted for rotation in a common plane, one being full of tape and the other empty and having means to rotate both said reels to wind tape on the empty reel, the outer tape end of the full reel having catching means thereon and the empty reel having catching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel, magnetic heads between the reels positioned for engagement by the tape after threading and while winding the same on the empty reel, means to reverse the winding direction of the reels and means to separate the belt from tape contact during the reverse winding.

15. In a tape recorder having a pair of flanged reels mounted for rotation in a common plane, one being full of tape and the other empty and having means to rotate both said reels to wind tape on the empty reel, the outer tape end of the full reel having catching means thereon and the empty reel having caching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape and catching means and deliver it to the catching means on the empty reel, means to separate the belt from tape contact and means to shield the tape from magnetic head contact during reverse winding.

16. In a tape threader having a pair of flanged reels mounted for rotation in a common plane, one being wound full of tape and the other empty and having means to rotate the empty reel, the outer tape end of the full reel having catching tines thereon and the empty reel having tine engaging means disposed axially thereof, a pair of arms each pivoted at one end thereof adjacent one reel and at the other end positioned for entry between the flanges of the adjacent reel, an endless tine engaging belt supported on said arms, the belt surface extending parallel to the reel axes around the arm free ends, means to urge the arms inwardly toward and radially of the reels to contact the tape on the full reel and the tine engaging means on the empty reel, means to drive the belt from tape engagement on the full reel to the tine engaging means on the empty reel, to engage the tape tines on the belt and deliver them to the tine engaging means on the empty reel, the empty reel rotating means driving said tine engaging means on the empty reel faster than the belt driving means moves the belt at the time of tine engagement with the empty reel tine engaging means to move the tape tines from the belt and hold them on the empty reel.

17. In a tape recorder having a pair of flanged reels mounted for rotation in a common plane, one being full of tape and the other empty and having means to rotate both said reels to wind tape on the empty reel and the full reel in the opposite direction, the outer tape end of the full reel having catching tines thereon and the empty reel having tine engaging means disposed axially thereof, a pair of arms each pivoted at one end thereof adjacent one reel and at the other end positioned for entry between the flanges of the adjacent reel, an endless tine engaging belt supported on said arms, the belt surface extending parallel to the reel axes around the arm free ends, means to urge the arms inwardly toward and radially of the reels to contact the tape on the full reel and the tine engaging means on the empty reel, the angular speed of the empty reel at the time of tine engagement therewith being greater than that of the adjacent belt to remove the tape tines from the belt and hold them on the empty reel, means to drive the belt from tape engagement on the full reel to the tine engaging means on the empty reel, to engage the tape tines on the belt and deliver them to the tine engaging means on the empty reel, the direction of initial rotation of the full reel being opposite to that of the belt upon belt contact with the tape thereon and being reversed upon engagement of the tape tines thereon with the belt.

18. In a tape threader having a pair of flanged reels mounted for rotation in a common plane, one being wound full of tape and the other empty and having means to rotate the empty reel, the outer tape end of the full reel having catching means thereon and the empty reel having catching means disposed axially thereof, a pair of arms each pivoted at one end adjacent one reel and at the other end positioned for entry between the flanges of the adjacent reel, an endless catching belt supported on said arms and extending parallel to the reel axes around their arm free ends, means to urge the arms inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel.

19. In a tape threader having a pair of flanged reels mounted for rotation in a common plane, one being wound full of tape and the other empty and having means to rotate the empty reel, the outer tape end of the full reel having catching means thereon and the empty reel having catching means disposed axially thereof, a pair of arms each pivoted at one end adjacent one reel and at the other end positioned for entry between the flanges of the adjacent reel, an endless catching belt supported on said arms and extending parallel to the reel axes around their arm free ends, means to urge the arms inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel, a pulley adjacent the pivoted end of one arm to hold the tape adjacent the belt thereon, the pulley being divided normal to the axis thereof and each section being insulated from the other, electric leads connected to each of said sections, the tape having thereon a conductor extending across the sections of the divided pulley to close the circuit between the sections thereof, which upon closing initiate succeeding threading operations.

20. In a tape threader having a pair of flanged reels mounted for rotation in a common plane, one being wound full of tape and the other empty and having means to rotate the empty reel, the outer tape end of the full reel having catching means thereon and the empty reel having catching means disposed axially thereof, an endless catching belt, means to support said belt in the plane of the reels for entry between the flanges thereof with the belt surface parallel to the reel axes, means to urge the belt supporting means inwardly toward and radially of the reels to contact the tape on the full reel and the catching means on the empty reel, means to drive the belt from tape contact on the full reel to the catching means contact on the empty reel, to engage the tape end catching means and deliver it to the catching means on the empty reel, a pulley adjacent the belt supporting means to hold the tape adjacent the belt thereon, the pulley being divided normal to the axis thereof and each section being insulated from the other, electric leads connected to each of said sections, the tape having thereon a conductor extending across the sections of the divided pulley to close the circuit between the sections thereof, which upon closing initiate succeeding threading operations.

References Cited in the file of this patent

UNITED STATES PATENTS

| | | |
|---|---|---|
| 1,260,185 | Gonsky | Mar. 19, 1918 |
| 2,412,551 | Pratt et al. | Dec. 10, 1946 |
| 2,503,453 | Pratt et al. | Apr. 11, 1950 |
| 2,512,900 | Kwitek | June 27, 1950 |
| 2,529,184 | Pearson | Nov. 7, 1950 |
| 2,535,486 | Dank | Dec. 26, 1950 |
| 2,633,503 | Camras | Mar. 31, 1953 |
| 2,645,495 | Nelson | July 14, 1953 |
| 2,695,545 | Evans | Nov. 30, 1954 |
| 2,775,407 | Elliott et al. | Dec. 25, 1956 |

FOREIGN PATENTS

| | | |
|---|---|---|
| 374,065 | Germany | Apr. 19, 1923 |